Oct. 27, 1942.                B. TREVOR                2,299,942
                     POWER CONVERTER AND REGULATOR
                          Filed Nov. 7, 1939
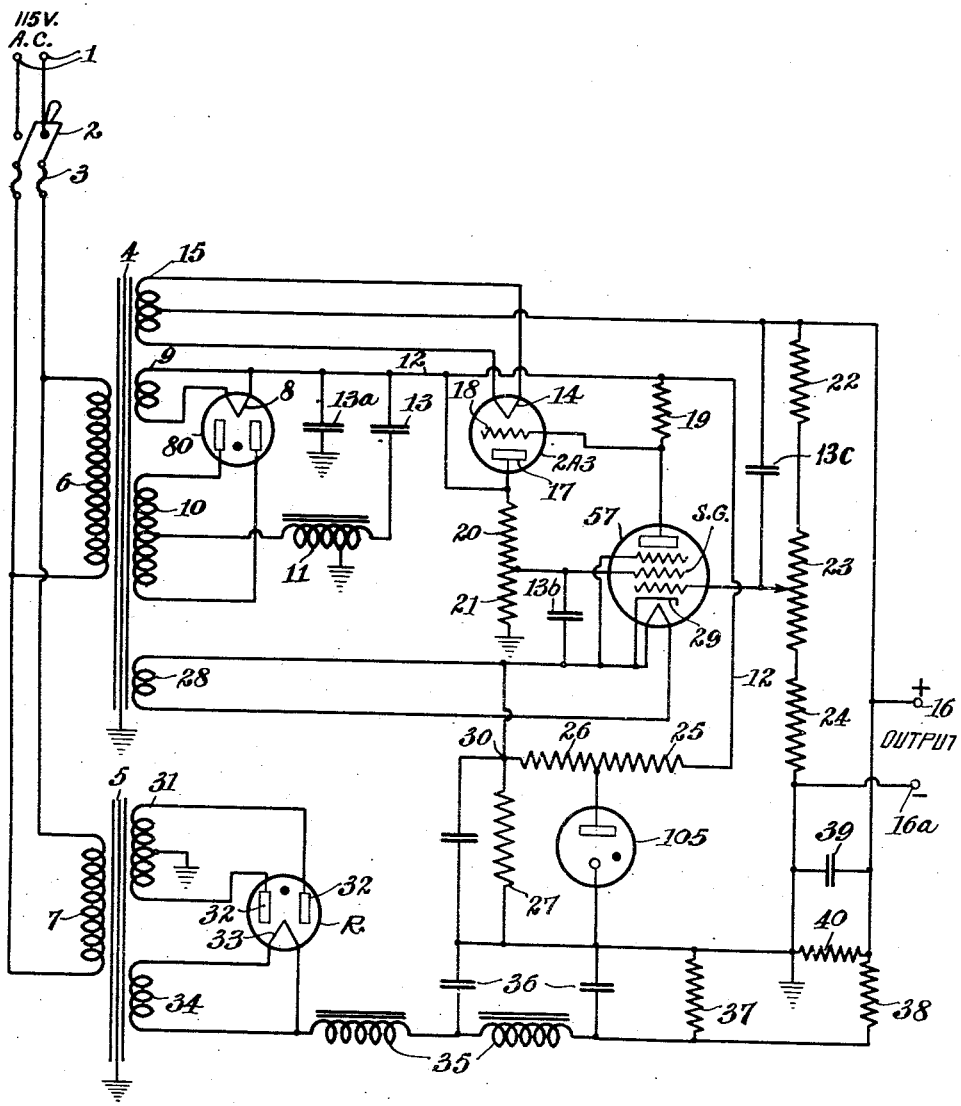
INVENTOR:
Bertram Trevor,
by
ATTORNEY.

Patented Oct. 27, 1942

2,299,942

UNITED STATES PATENT OFFICE 2,299,942

POWER CONVERTER AND REGULATOR

Bertram Trevor, Riverhead, N. Y., assignor to Radio Corporation of America, a corporation of Delaware Application November 7, 1939, Serial No. 303,186

10 Claims. (Cl. 175—363)

This invention relates to a system for converting alternating current power into direct current which is suitably regulated for use, for example, in radio apparatus.

It is an object of my invention to provide a power converter and regulator which will deliver a larger amount of regulated power than would be available under the limitations of a certain well known type of regulated power supply unit.

It is another object of my invention to provide a combination of two power supply units, one of which delivers a higher voltage than the other but is unregulated; the combined output of the two power units being effectively regulated.

Other objects and advantages of my invention will become apparent from the following detailed description, which may be best understood by reference to the accompanying drawing.

The sole figure of the drawing shows diagrammatically a circuit arrangement of a preferred embodiment of the invention.

In carrying out my invention I preferably employ an unregulated power supply unit which delivers a voltage somewhat in excess of that delivered by another power supply unit also used and having voltage regulation devices inherent therein. The power delivered at the output terminals of the combining circuit is substantially in excess of that which could be supplied by the unregulated power supply alone. The excess load is supplied by the regulated power unit up to its overload point. A series resistor is interposed between the positive output terminal of the unregulated power supply unit and that of the regulated power supply unit so as to cut down the voltage to that of the regulated unit alone.

One considerable advantage of employing two units in the manner above suggested is that two of a certain inexpensive type of mercury rectifier tubes may be used to meet a load demand which is in excess of the overload limit of one tube alone, and furthermore, the voltage regulation when applied to the output from one rectifier tube is found to be practically as effective as if applied to the total output from the two rectifier tubes. Thus the increased load demands may be met without increase in the cost of the voltage regulator devices.

Referring to the drawing, I show therein an alternating current power supply source fed to the terminals 1. This source may be considered as one of 115 volts, by way of example. The A. C. current is fed through the switch 2 and fuses 3 to two transformers 4 and 5. The primaries of these transformers are designated 6 and 7 respectively. Transformer 4 is provided with a number of secondary windings, as is usual in regulated power units. Transformer 5 is provided with only two secondary windings, because it serves an unregulated power supply system.

Referring first to the regulated power unit, I show a full wave rectifier tube 80 having a filament 8 supplied with heating current from the secondary winding 9. The tube 80 has two anodes appropriately connected to the terminals of the secondary winding 10. This secondary winding has a mid-tap which is connected through a choke 11 to ground. A portion of the choke is coupled by the capacitor 13 to the positive output lead 12 from the filament 8.

The output energy from the full wave rectifier tube 80 is somewhat smoothed by the choke 11 and by the capacitor 13, but it possesses a ripple component which needs further smoothing, and, furthermore, voltage regulation is essential. This is accomplished by means of tubes 2A3 and 57, together with the circuit connections thereto. The tube 2A3 is a voltage regulating tube which functions as a series resistor in the output line. It is provided with a filament 14 which is fed from the secondary 15 on the transformer 4. This secondary is center-tapped in order to feed current directly to the positive output terminal 16. The tube 2A3 has an anode 17 which is directly connected to the positive supply lead 12. The grid 18 of the tube 2A3 is connected through a resistor 19 to the conductor 12. Voltage regulation results from varying the value of the grid voltage which depends upon the voltage drop across the resistor 19.

Further voltage regulation is provided by the tube 57, which is preferably of the pentode type. The filament of this tube is supplied with heating current from the transformer secondary 28. The cathode 29 is normally carried at a certain positive potential with respect to ground, being connected to a junction point 30 between the resistors 27 and 26. These resistors together with resistor 25 form a potentiometer from conductor 12 to ground.

The functioning of the circuit arrangement may be best understood by an example.

Assume that the voltage at a particular instant is reduced across the plus and minus terminals 16 and 16a respectively, either by reason of high load current or a low A. C. line voltage. This would cause a reduced voltage from the positive terminal 16 through resistors 22, 23 and 24 to ground. Resistor 23 is a voltage adjusting potentiometer, a tap from which is connected to the control grid of the tube 57. Inasmuch as the cathode 29 is normally carried at a more positive potential with respect to ground than is the control grid of the tube 57, the condition of this reduced voltage on the output terminals will cause an increased negative voltage to be applied between the cathode and the grid of the tube 57.

Increasing the negative potential on the grid of the tube 57 reduces its plate current and consequently the voltage drop across the resistor 19. This causes the grid of the tube 2A3 to become less negative and its resistance is reduced. Thus the voltage drop across the tube 2A3 is reduced, so that an increased voltage is delivered at the output terminal 16. This compensates for the voltage reduction caused by a heavier load or by low line voltage.

The cooperation between tubes 57 and 2A3 is characterized by very rapid action and a constant voltage output results. Whatever ripple voltage may remain unfiltered in the output circuit is applied across the capacitor 13c in such manner as to be effective on the grid of tube 57. Hence the regulating action of the circuit also functions to cause hum reduction. The final result is one which delivers a direct current substantially free from ripple voltage.

Further voltage regulation is obtained by means of the cold cathode glow discharge tube 105. This tube functions to maintain a fairly constant voltage across a portion of the circuit where it may be desired to provide, say, a plus 105 volt tap as compared with a positive potential 200 volts which is to be maintained on the terminal 16. The anode of the tube 105 is connected between the resistors 25 and 26, while the cathode is grounded. Although it requires a somewhat higher voltage to start this tube (the higher voltage being normally attainable when warming up the system), the tube 105, after excitation, maintains a substantially constant D. C. drop of 105 volts across its electrodes.

It will be seen from the above description that, if the circuit constants of the arrangement so far described are suitably designed for delivering output current at 200 volts, for example, this voltage will be maintained up to the limit of the capacity of the system, say, for delivering $\frac{1}{10}$ of an ampere. However, in cases where a greater load is to be served, it is a feature of my invention that this condition may be met by the addition of an unregulated power supply unit, operating preferably at a higher voltage than the regulated power unit. The auxiliary power unit is fed from the secondary 31 on the transformer 5. The terminals of this secondary are connected at the two anodes 32 of a mercury rectifier tube R which may, if desired, be of the same type as the tube 80 in the regulated power supply unit. The filament 33 of tube R is heated by the secondary winding 34. Output current from this full wave rectifier R is filtered by means of the choke coils 35 and the capacitors 36, the latter coupling the positive output lead to ground, and by a bleeder resistor 37. The load energy from this power unit may be fed across a voltage dropping resistor 38 to the positive output terminal 16. Further filtering of the complete circuit arrangement may be obtained by means of a capacitor 39 connected between the terminals 16 and 16a, also by an additional bleeder resistor 40, also connected across these terminals.

It will be evident to those skilled in the art that in combining these two power units as above described, it is possible to meet load demands which are considerably greater than can be handled by the regulated power supply alone, and that the combination is less costly to build than a single regulated power supply system would be if constructed to handle the equivalent load.

Various modifications and adaptations of my system to different requirements may, of course, be made without departing from the spirit of the invention. The invention itself is, therefore, to be considered as limited in scope only in accordance with the claims.

I claim:

1. In combination, a thermionic power converter for changing alternating current into direct current, a voltage regulator of the type having a variable impedance through an electron discharge path, said regulator being operative upon the output from said converter, a second thermionic power converter adapted to deliver unregulated direct current power at a voltage exceeding that of the regulated output from the first said converter, a load exceeding the maximum load limit of either single converter, direct connections from the first said converter through its regulator to said load, parallel connections from the second said converter to said load, and a series resistor in said parallel connections for equalizing the voltages of the currents delivered by the respective converters.

2. In combination, a discharge tube circuit arrangement constituted as a thermionic direct current power converter system, means including an electron discharge tube controlled by the output from said system for regulating the terminal voltage thereof, an unregulated direct current power converter system, an alternating current source for feeding input energy to both of said systems, circuit means including a series resistor for combining the output energies from the two said converters and for equalizing the voltages delivered therefrom to their common out-put terminals, and a load carried by the two said converters, said load being greater than the output limit of either single converter.

3. The method of supplying direct current power up to a predetermined load value through an electronic voltage regulator, and of augmenting said power by unregulated direct current power, the combined power being fed to a given load, which method comprises rectifying an alternating current, causing said voltage regulator to deliver said current at a substantially constant terminal voltage, capacitively absorbing a ripple component of said rectified current, independently rectifying an additional amount of said alternating current, reducing the voltage of said additional amount to that of the regulated rectified current, combining said rectified currents, and feeding the same to said load.

4. In apparatus for supplying direct current power to a given load, a pair of parallel-connected power converter units interposed between an alternating current source and said load, each of said units having an output load limit less than is necessary to singly sustain said load, a voltage regulator of the type having a variable impedance through an electron discharge path, said regulator being operative upon and under control of output energy from one only of said converter units, and means including a voltage reducing resistor interconnecting the other of said converter units and said load for equalizing the voltages supplied to said load from the two said units.

5. A device in accordance with claim 4 wherein said voltage regulator comprises a discharge tube constituting a variable series resistor between the associated converter unit and said load, and an amplifier tube operable to vary the conductance of said discharge tube to compensate for variations in the impedance of said load and variations in the rectified voltage of the output energy from said converter unit.

6. The combination of two thermionic direct current power supply systems, a load common to said systems, a variable impedance through an electron discharge path in circuit between one of said systems and said load, a fixed impedance in circuit between the other of said systems and said load, and means for regulating the voltage drop through said variable impedance thereby to maintain substantially constant the voltage of the power delivered to said load.

7. In combination, a thermionic power converter for changing alternating current to direct current; a voltage regulator operative upon the output from said converter, said regulator including a variable impedance, a fixed impedance and electronic means controlled by the voltage drop in said fixed impedance for adjusting the value of said variable impedance; a second thermionic power converter adapted to deliver unregulated direct current power at a voltage exceeding that of the regulated output from the first said converter; a load in shunt with said fixed impedance; direct connections from the first said converter through its regulator to said load; parallel connections from the second said converter to said load; and a series resistor in said parallel connections for equalizing the voltages of the currents delivered by the respective converters.

8. The apparatus as defined by claim 4 and including two electron discharge tubes in said voltage regulator, one of said tubes being operative in response to unregulated voltage variations to vary the control bias applied to the other of said tubes.

9. The combination according to claim 7 in which said variable impedance is an electron discharge tube.

10. In combination, a discharge tube circuit arrangement constituted as a thermionic direct current power converter system, having means including two electron discharge tubes for regulating the terminal voltage of said system, one of said tubes being subject to control by variations of input voltage derived from the unregulated side of said converter system, and the other of said tubes being controlled by the first said tube and providing a path of variable impedance through its discharge zone to a connected load, an unregulated direct current power converter system, an alternating current source for feeding energy to both of said systems, and circuit means including a series resistor for combining the output energies from the two converters and for equalizing the voltages delivered therefrom to said load.

BERTRAM TREVOR.